(12) United States Patent
Wier

(10) Patent No.: US 6,324,987 B1
(45) Date of Patent: Dec. 4, 2001

(54) PYROTECHNIC MEANS FOR VEHICLE OCCUPANT PROTECTION SYSTEMS

(75) Inventor: Franz Wier, Göggingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/086,496

(22) Filed: May 28, 1998

(30) Foreign Application Priority Data

May 28, 1997 (DE) .......................... 297 09 390 U
Nov. 24, 1997 (DE) .......................... 297 20 819 U

(51) Int. Cl.⁷ ............................................ C06D 5/00
(52) U.S. Cl. .............. 102/530; 102/202.5; 102/202.14; 280/741; 280/737
(58) Field of Search ........................ 102/530, 531, 102/202.5, 202.14; 280/741, 737

(56) References Cited

U.S. PATENT DOCUMENTS

| 3,760,729 |   | 9/1973  | Freeman .         |         |
|-----------|---|---------|-------------------|---------|
| 3,874,564 | * | 4/1975  | Huneke            | 222/363 |
| 4,097,241 | * | 6/1978  | Gamer et al. .    |         |
| 4,370,930 | * | 2/1983  | Strasser et al.   | 102/530 |
| 5,062,367 | * | 11/1991 | Hayashii et al.   | 102/530 |
| 5,100,174 | * | 3/1992  | Jasken et al.     | 102/530 |
| 5,114,179 | * | 5/1992  | Emery et al.      | 102/530 |
| 5,221,109 | * | 6/1993  | Marchant          | 102/530 |
| 5,308,588 | * | 5/1994  | Emery et al. .    |         |
| 5,423,261 |   | 6/1995  | Bernardy et al. . |         |
| 5,437,188 |   | 8/1995  | Frantom et al. .  |         |
| 5,447,105 | * | 9/1995  | Bauer et al.      | 102/530 |
| 5,482,316 | * | 1/1996  | Lang et al.       | 102/531 |
| 5,483,896 | * | 1/1996  | Hock et al.       | 102/530 |
| 5,527,067 | * | 6/1996  | Iwai et al.       | 102/531 |
| 5,556,130 | * | 9/1996  | Fulmer            | 102/530 |
| 5,593,180 | * | 1/1997  | Cuevas et al.     | 102/530 |
| 5,624,134 | * | 4/1997  | Iwai et al. .     |         |
| 5,634,660 |   | 6/1997  | Fink et al. .     |         |
| 5,763,814 |   | 6/1998  | Avory et al. .    |         |

FOREIGN PATENT DOCUMENTS

| 0001169    | * | 6/1889  | (CH) | 102/530 |
|------------|---|---------|------|---------|
| 0600791    |   | 6/1994  | (EP) .|        |
| 0704348    |   | 9/1995  | (EP) .|        |
| 0193482    | * | 10/1888 | (FR) | 102/530 |
| 9511421    |   | 4/1995  | (WO) .|        |
| 9520509    |   | 8/1995  | (WO) .|        |
| WO 98/12078 | * | 3/1998 | (WO) .|        |

\* cited by examiner

*Primary Examiner*—Thomas Price
(74) *Attorney, Agent, or Firm*—Tarolli, Sundheim, Covell, Tummino & Szabo L.L.P.

(57) ABSTRACT

A pyrotechnic means for vehicle occupant protection systems includes a container for an ignitor, propellant and/or compressed gas. To facilitate the production of gas tight pyrotechnic means having long term stability the container includes a container body and at least one container lid with an ultrasonic welded joint between said container body and said container lid.

3 Claims, 5 Drawing Sheets a)

b)

PYROTECHNIC MEANS FOR VEHICLE OCCUPANT PROTECTION SYSTEMS

FIELD OF THE INVENTION

The invention relates to a pyrotechnic means for vehicle occupant protection systems including a container for an ignitor, propellant and/or compressed gas.

BACKGROUND OF THE INVENTION

Pyrotechnic means in the field concerned are known wherein an electrically actuated ignitor is surrounded by a solid propellant which is capable of spontaneous combustion on being ignited. The resulting hot gas serves, for instance, to ignite further propellant charges or directly for inflating a gas bag or for tensioning a seat belt. Also known are pyrotechnic means wherein an electrically actuated ignitor is surrounded by a minor quantity of solid propellant and ignitor and propellant are arranged within a container filled with compressed gas. Ignitor and propellant serve on ignition to open a bursting diaphragm provided in the container and in subsequent exit of the compressed gas to compensate the losses in temperature and pressure thereof during a specific time span. Typically the container for ignitor, propellant and/or compressed gas is press fitted with a mounting so that ambient effects such as e.g. moisture are kept away from the interior of the container. If the container is required to be gas-tight, for example 0.5% loss in 15 years at 220 bar helium, the container needs to be sealed by complicated and expensive methods, such as e.g. glass potting the joints, due to welding or soldering being prohibitive in view of the high temperatures involved which would otherwise damage or detriment the ignitor, propellant or compressed gas.

It is the intention of the invention to facilitate production of gas-tight pyrotechnic means having long-term stability.

SUMMARY OF THE INVENTION

For this purpose in accordance with the invention a pyrotechnic means is provided for vehicle occupant protection systems including a container for an ignitor, a propellant and/or compressed gas wherein the container includes a container body and at least one container lid and a gas-tight ultrasonic welded joint is provided between the container body and the container lid. This ultrasonic welded joint is gas-tight and in addition has long-term stability. Due to the contact surface areas between container body and container lid being heated up only locally due to friction in ultrasonic welding the remainder of the container remains more or less cold so that ignitor, propellant or compressed gas are not heated up, or merely insignificantly so, during ultrasonic welding. It has been surprisingly discovered that during ultrasonic welding the heating up fails to be propagated to the inner walls in contact with the propellant.

In one aspect of the invention the container body and/or the container lid are made of a non-ferrous heavy metal or an alloy of non-ferrous heavy metal. Using a non-ferrous heavy metal or an alloy of non-ferrous heavy metal offers good conditions for ultrasonic welding between container body and container lid. For example, the application of Cu 99.5, a bronze alloy, or a brass alloy is possible. Preferably a soft material is employed for the container lid and a harder material for the container body. A harder material for the container body promotes a controlled bursting action of a bursting diaphragm provided in the wall thereof.

In an advantageous manner, container body and/or container lid can also be made of aluminium or an aluminium alloy. Container and container lid are preferably made of Al 99.5–99.75 or an aluminum alloy such as e.g. AlMgSi 0.5.

In another aspect the container body comprises a peripheral wall, the face surface area of which locates the container lid. Configuring the container body in this way results in an arrangement of advantage for ultrasonic welding. Due to the desired high surface area pressure during welding the contact surface area between container body and container lid is maintained as narrow as possible, for example <1 mm.

It is of advantage when the face surface area of the peripheral wall is chamfered in the direction of the container opening and the container lid rests against the face surface area and the chamfer. As a result, the container lid is centered in place simply by being mounted on the container body due to the container lid then being in contact with the face surface area and chamfer. Welding is done in the region of the face surface area and in the region of the chamfer or only in one of the two regions. With the container and the container lid being configured like this, it is possible especially with thin-walled containers to prevent lateral buckling of the peripheral wall in case of welding pressure applied from above by lateral support of the peripheral wall.

It is likewise of advantage when the container body comprises a peripheral flange on which the container lid is mounted. Also in the case of very thin-walled containers this creates a contact surface area of sufficient stability for an ultrasonic weld. In addition to this a peripheral flange can be well supported, so that the desired surface area pressure during welding can be produced in a simple manner.

In yet a further aspect of the invention it is provided for that a bursting diaphragm is formed in the container body and/or the container lid. Such a bursting diaphragm simplifies production of the pyrotechnic means since no separate bursting diaphragm needs to be connected gas-tight to the container body or the container lid.

In still another aspect of the invention the region of the bursting diaphragm is surrounded by a notch. As a result, a controlled bursting response of the bursting diaphragm is made possible once a predetermined internal pressure has been attained.

In a final aspect of the invention it is provided for that the region of the bursting diaphragm is offset. Offsetting of the bursting diaphragm may be done, for example, by drawing down. It is likewise possible to produce the complete container lid or container body including the bursting diaphragm by cold extrusion or deep drawing. Offsetting the bursting diaphragm results in strain-hardening of the offset portion so that the bursting diaphragm bursts as defined or is punctured by the internal pressure, instead of bulging in part and bursting without control like a soft material.

BRIEF DESCRIPTION OF THE DRAWINGS

Further features and advantages of the invention read from the following description and from the drawing to which reference is made and in which.

DESCRIPTION OF THE PREFERRED EMBODIMENTS

Figure 1:
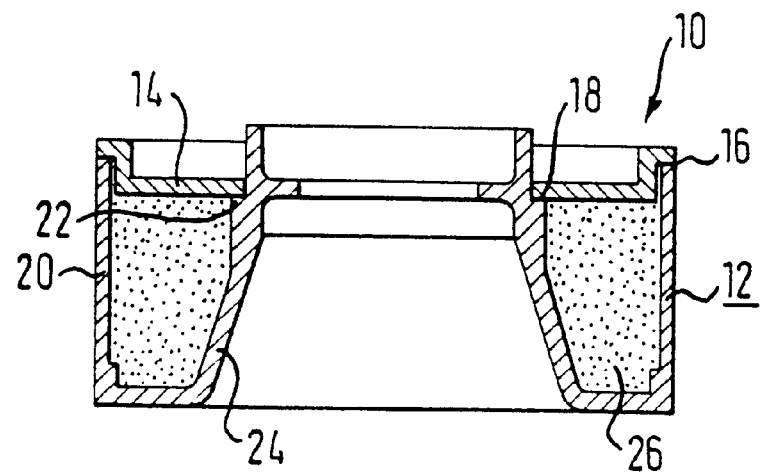
FIG. 1 is a section view of the container of a first embodiment of a pyrotechnic means in accordance with the invention.

Referring now to FIG. 1 there is illustrated a rotationally symmetrical container 10 of a pyrotechnic source of compressed gas. The container 10 serves to receive a propellant charge which is ignited by a conventional ignitor (not shown) arranged outside of the container burning through one wall of the container 10 The container 10 consists of a container body 12 and a container lid 14, both made of aluminum and contacting each other at annular contact surface areas 16 and 18 where they are ultrasonically welded gas-tight. One such rotationally symmetrical container may be arranged upstream of a piston in a cylinder of a belt tensioner, for instance. A Bowden cable necessary for tensioning the belt then extends through the middle of the toroidal container 10. The container lid 14 comprises at its outer rim a cranked portion supporting the face surface area of the outer peripheral wall 20 of the container body 12. The inner rim of the container lid 14 locates a raised face 22 configured on the inner peripheral wall 24 of the container body.

In this arrangement the container body 12 and container lid 14 thus circumscribe an annular inner space provided to receive the propellant 26. To weld the container body 12 and container lid 14 to each other, after the propellant has been filled, the container body 12 is supported by its underside and a pressure oriented downwards as shown in FIG. 1 is exerted on the container lid 14 in the region of its outer and inner rim so that an even surface area pressure is produced at the peripheral contact surface areas 16 and 18. At the same time the container body 12 and container lid 14 are caused to vibrate at least in the region of the contact surface areas 16 and 18 so that they are moved relative to each other horizontally as shown in FIG. 1. The vibration frequency in this region is in the ultrasonic range and the amplitude is of the order of 30 μm. Due to the surface area pressure and the relative movement in the region of the contact surface areas 16, 18 this region is heated up strongly, resulting in a weld joint. In this arrangement the heating up is restricted substantially to the region of the contact surface areas 16 and 18 so that the remaining regions of the container body 12 and container lid 14 remain more or less cold. As regards gas-tightness the weld features substantially the same properties as the base material of the container body 12 and of the container lid 14 so that excellent properties are achieved without the need for any additional sealing measures.

The wall thickness of the peripheral wall 20 of the container body 12 is less than that of the remaining walls and than that of the container lid 14 so that, for one thing, a fast burn-through of the peripheral wall 20 can; be achieved by the ignitor being arranged outside of the container and, for another, the peripheral wall 20 is the first to burst following ignition of the propellant 26 within the container 10.

Figure 2:
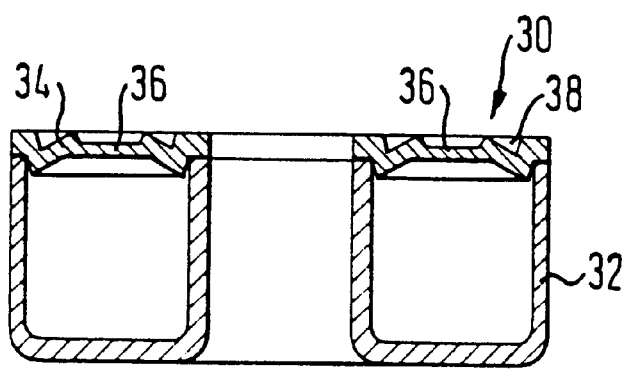
FIG. 2 is a section view of the container in a second embodiment.

Referring now to FIG. 2 there is illustrated a section view of a container 30 of a second embodiment of the invention. Like the embodiment as shown in FIG. 1 a container body 32 and a container lid 34 define an annular interior space for receiving the propellant. The container lid 34 comprises a bursting diaphragm 36 which is offset meaning positioned on a different plane, relative to the surface of the container lid 34, as shown in FIG. 2, and is surrounded by a notch 38. The wall thickness of the container lid 34 is greatly reduced in the region of the bursting diaphragm 36 so that the bursting diaphragm 36 is the first to burst on ignition of the propellant in the container 32. In producing the container lid 34, for instance by cold extrusion, the region of the burst diaphragm 36 is strain-hardened to thus burst in a more defined response than would be in the case of a softer material.

Figure 3:
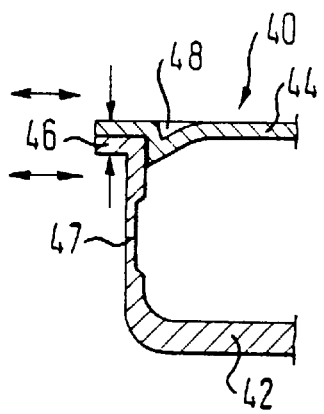
FIGS. 3 to 6 are section views of various aspects of the contact region between container lid and container body.

Referring now to FIG. 3 there is illustrated a section view of the outer rim portion of a container 40 which in turn consists of a container body 42 and a container lid 44. The container body 42 comprises a peripheral flange 46 supporting the rim portion of the container lid 44. For welding the flange 46 and the rim portion of the container lid 44 to each other, they are pressed together and caused to vibrate horizontally to each other in the ultrasonic range as indicated by the arrows in FIG. 3. A bursting diaphragm 47 configured in the peripheral wall of the container body 42 is burnt through by a conventional ignitor arranged outside, and a peripheral notch 48 in the container lid 44 ensures a controlled bursting response of the container 40 following ignition of the propellant in the container 40. The bursting diaphragm 47 formed in the container body 12 is surrounded by a notch.

Figure 4:
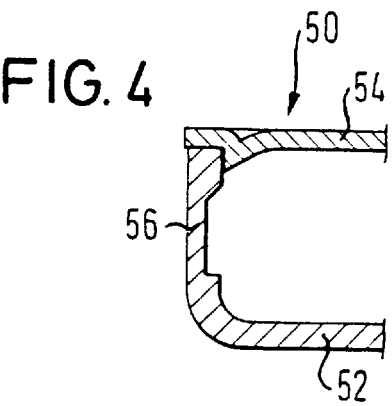

Referring now to FIG. 4 there is illustrated a container 50, wherein for the ultrasonic welding between container body 52 and container lid 54 the face surface area of an outer peripheral wall 56 of the container body 52 is provided.

Figure 5:
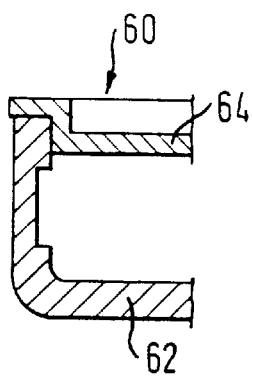

Referring now to FIG. 5 there is illustrated a further container 60 comprising a container body 62 and a container lid 64. The container lid 64 is cranked at right angles in its outer rim portion to thus be reliably supported by the container body 62.

Figure 6:
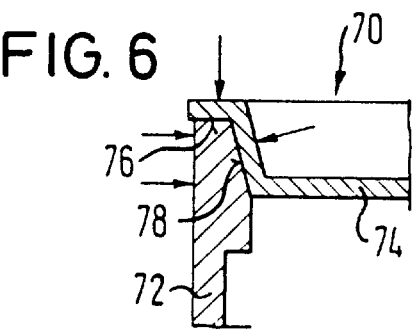

Referring now to FIG. 6 there is illustrated section wise a container 70, the container body of which comprises an outer peripheral wall 72 supporting a container lid 74. The face surface area 76 of the peripheral wall 72 is chamfered in the direction of the container opening, as a result of which a chamfer 78 is formed. Complying with the angle of inclination of the chamfer 78 the container lid 74 is cranked so that it rests against both the face surface area 76 and the chamfer 78. A uniform ultrasonic weld is achieved in the region of the face surface area 76 and of the chamfer 78 by pressure being exerted on the container body 72 and the container lid 74 in the direction of the arrows as evident in FIG. 6. As a result, more particularly, mere localized welding at the points of contact is avoided, i.e. instead a full surface area gas-tight weld being achieved.

Figure 8:
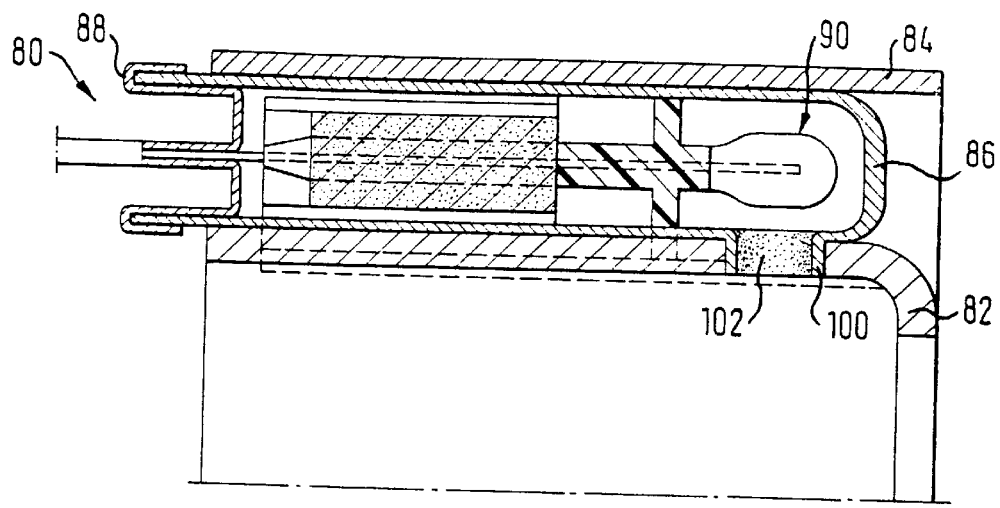
FIG. 8 is a side section view taken along the line VIII—VIII of FIG. 7.
Figure 7:
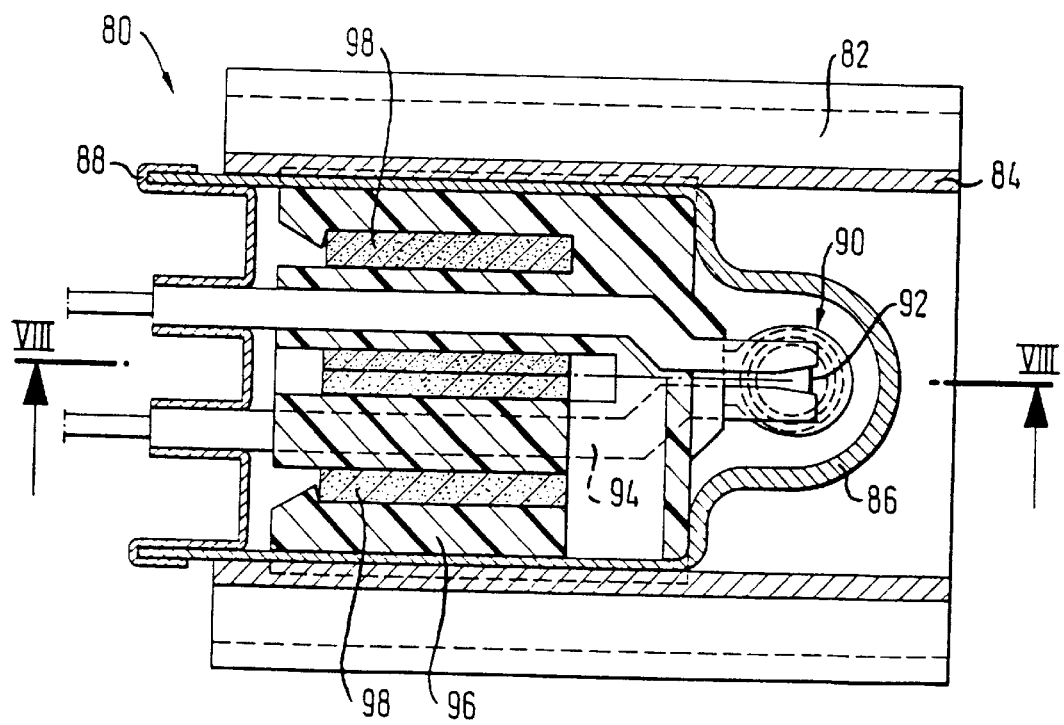
FIG. 7 is a section view of a further embodiment of the pyrotechnic means in accordance with the invention.

Referring now to FIGS. 7 and 8 there is illustrated a further embodiment of a pyrotechnic source of compressed gas in accordance with the invention. The pyrotechnic means as shown in FIGS. 7 and 8 is configured as an ignitor 80 provided for igniting a conventional propellant charge for a conventional belt tensioner (not shown). The ignitor 80 is arranged on a tubular inflator 82 in which a propellant charge (not shown) is located and which is held in contact with the inflator 82 by a clamping ring 84. The ignitor 80 comprises a container comprising a container body 86 and a container lid 88, both made of aluminum and produced as deep drawn or cold extruded parts. Arranged within the container is a squib 90 comprising a filament 92 connecting two electric leads 94 to each other. The electric leads 94 are embedded in a plastic body 96 which together with ferromagnetic components 98 is inserted in the container body 86. In the region of the squib 90 the container body 86 comprises a projection 100 including a booster charge 102 inserted in an opening of the inflator 82 and the thin wall of which can be penetrated on ignition. Container body 86 and container lid 88 are secured and sealed to each other by an ultrasonic weld joint.

Figure 10:
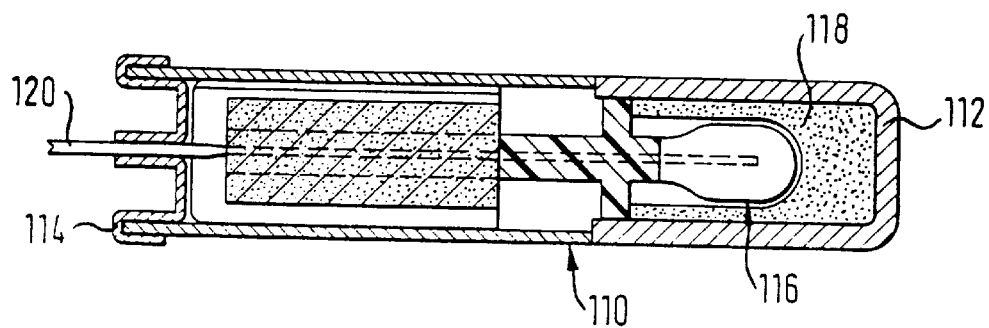
FIG. 10 is a side section view taken along the line X—X of FIG. 9.
Figure 9:
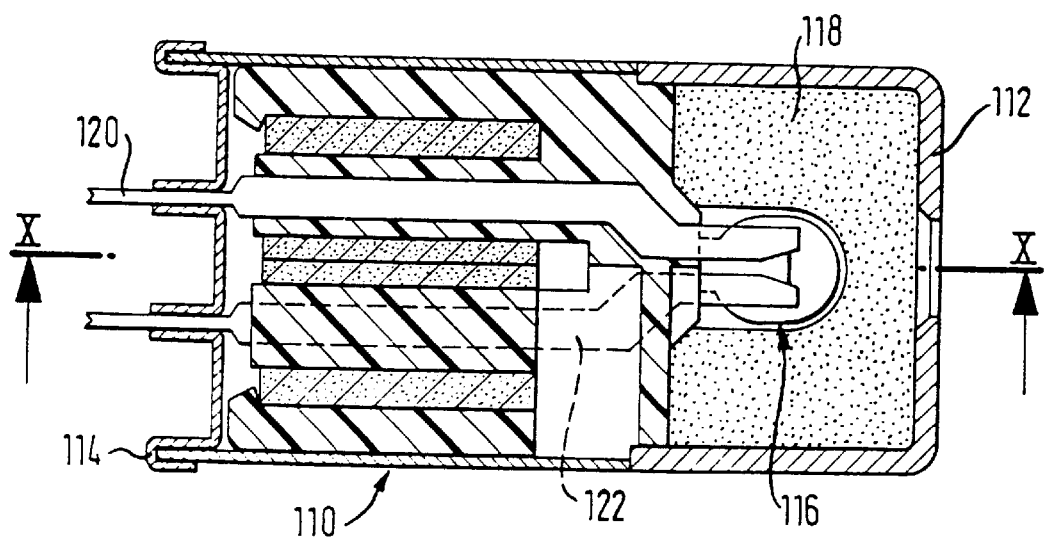
FIG. 9 is a section view of a further embodiment of the pyrotechnic means in accordance with the invention.

Referring now to FIGS. 9 and 10 there is illustrated the situation in which the ignitor can be integrated in an gas generator 110. In this arrangement the container consisting of the container body 112 and container lid 114 represents not only the housing of the ignitor but also that of the inflator 110. Provided within the container in the region of the squib 116 is space for accommodating a propellant charge 118. The container body 112 comprises in the region surrounding the squib 116, i.e. the combustion chamber, a greater wall thickness. Container lid 114 and container body 112 are welded to each other by an ultrasonic weld, whilst the contact pins 120 extending through the container lid 114, as continuations of the leads 122, are sealed off conventionally, for example, with the aid of a sealing compound.

Figure 11:
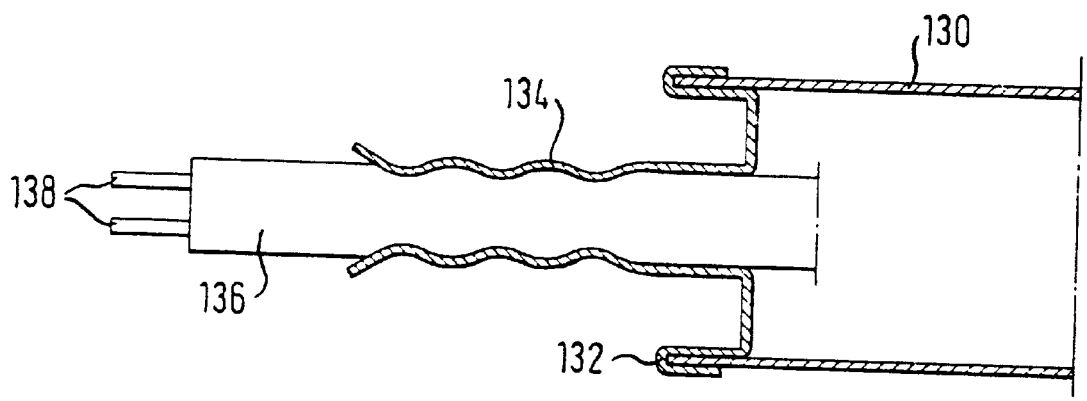
FIG. 11 illustrates one possibility of sealing a cable leadthrough.

Referring now to FIG. 11 there is illustrated a further possibility of sealing off the leads and container lid. The container body 130 and container lid 132 are connected to each other by an ultrasonic weld. Formed protruding from the container lid 132 is a tubular sleeve 134 which is sealed off by pressing it for sealing engagement with a sleeve 136 of the electric leads 138.

Figure 12:
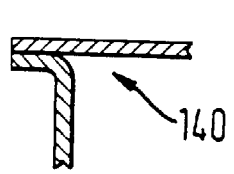
FIG. 12 is a partial section view of a container suitable for tube installation.
Figure 12:
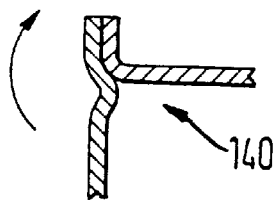

Referring now to FIG. 12 there is illustrated sectionwise a container 140 which has been ultrasonic welded in the region of its peripheral flange as evident from FIG. 12*a*. In this arrangement the peripheral flange permits simple and reliable ultrasonic welding whilst causing problems in installing the container in a tube. If the container 140 is thus installed, for example, in the tube of a belt tensioner, the peripheral flange, as shown in FIG. 12*b*, is bent up. The container 140 can then be inserted into a tube without problems.

What is claimed:

1. A pyrotechnic device of a vehicle occupant protection system comprising: a container accommodating an igniter and at least one of a propellant and a compressed gas, said container including a container body and at least one container lid with an ultrasonic welded joint between said container body and said container lid, and a bursting diaphragm integrally formed in said container in one of said body and said lid, said bursting diaphragm being surrounded by a notch for ensuring a controlled bursting of said diaphragm.

2. The pyrotechnic device as set forth in claim 1 wherein said container body includes a peripheral wall, said bursting diaphragm being formed in said peripheral wall and being offset relative to the surface of said peripheral wall adjoining said bursting diaphragm.

3. The pyrotechnic device as set forth in claim 1 wherein said bursting diaphragm is formed in said container lid, said bursting diaphragm being offset relative to the surface of said container lid adjoining said bursting diaphragm.

* * * * *